US012321468B2

(12) United States Patent
Sharma

(10) Patent No.: US 12,321,468 B2
(45) Date of Patent: Jun. 3, 2025

(54) OBSCURING OBJECTS IN DATA STREAMS USING MACHINE LEARNING

(71) Applicant: Meta Platforms Technologies, LLC, Menlo Park, CA (US)

(72) Inventor: Priyanka Sharma, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 253 days.

(21) Appl. No.: 17/591,125

(22) Filed: Feb. 2, 2022

(65) Prior Publication Data
US 2023/0244799 A1 Aug. 3, 2023

(51) Int. Cl.
G06F 21/60 (2013.01)
(52) U.S. Cl.
CPC .................. G06F 21/604 (2013.01)
(58) Field of Classification Search
CPC ..................................... G06F 21/604
See application file for complete search history.

(56) References Cited

U.S. PATENT DOCUMENTS

| | | |
|---|---|---|
| 6,559,863 B1 | 5/2003 | Megiddo |
| 8,537,196 B2 | 9/2013 | Hegde et al. |
| 8,581,958 B2 | 11/2013 | Baker et al. |
| 8,675,067 B2 | 3/2014 | Chou et al. |
| 9,338,404 B1 | 5/2016 | Egeler et al. |
| 9,401,095 B2 | 7/2016 | Kubota et al. |
| 9,460,340 B2 | 10/2016 | Kauffmann et al. |
| 9,841,814 B1 | 12/2017 | Kallmeyer et al. |
| 9,959,676 B2 | 5/2018 | Barzuza et al. |
| 10,182,210 B1 | 1/2019 | Goetzinger, Jr. |

(Continued)

FOREIGN PATENT DOCUMENTS

| | | |
|---|---|---|
| CA | 3039347 A1 | 4/2018 |
| WO | 2020117657 A1 | 6/2020 |

OTHER PUBLICATIONS

Gupta K., et al., "Do You See What I See? The Effect of Gaze Tracking on Task Space Remote Collaboration," IEEE Transactions on Visualization and Computer Graphics, Nov. 2016, vol. 22, No. 11, pp. 2413-2422, DOI: 10.1109/TVCG.2016.2593778.

(Continued)

Primary Examiner — Kevin Bechtel
Assistant Examiner — Forrest L Carey
(74) Attorney, Agent, or Firm — Potomac Law Group, PLLC; Dannon G. Allbee

(57) ABSTRACT

Aspects of the present disclosure are directed to obscuring objects in data streams using machine learning. A data stream captured at a client device associated with a principal user (e.g., video stream, artificial reality session, and the like) can be processed to recognize objects in the stream. Based on user preferences that define object sharing rules, one or more of the recognized objects can be obscured from the data stream. For example, when the principal user's data stream is displayed to the participant users, such as during a video conference, objects in the principal user's data stream can be obscured according to the object sharing rules. Different groups of object sharing rules (e.g., profiles) can be used for different participant users or session types. Machine learning can be used to learn trends and predict a profile for use with a current or future shared streaming data session.

20 Claims, 10 Drawing Sheets

(56) References Cited

U.S. PATENT DOCUMENTS

| | | | |
|---|---|---|---|
| 10,212,428 | B2 | 2/2019 | Trepte |
| 10,298,587 | B2 | 5/2019 | Hook et al. |
| 10,311,383 | B2 | 6/2019 | Holmes et al. |
| 10,403,050 | B1 | 9/2019 | Beall et al. |
| 10,499,033 | B2 | 12/2019 | Pesonen |
| 10,554,931 | B1 | 2/2020 | Zavesky et al. |
| 10,582,191 | B1 | 3/2020 | Marchak, Jr. et al. |
| 10,664,772 | B1 | 5/2020 | Poel et al. |
| 10,701,318 | B2 | 6/2020 | Valli |
| 10,917,613 | B1 | 2/2021 | Chiarella et al. |
| 10,952,006 | B1 | 3/2021 | Krol et al. |
| 11,140,361 | B1 | 10/2021 | Krol et al. |
| 11,302,063 | B2 | 4/2022 | Cabral et al. |
| 11,302,085 | B2 | 4/2022 | LeBeau et al. |
| 11,394,925 | B1 | 7/2022 | Faulkner et al. |
| 11,456,887 | B1 | 9/2022 | McCracken et al. |
| 11,475,634 | B2 | 10/2022 | Atlas et al. |
| 11,528,312 | B2 | 12/2022 | Oyman |
| 11,556,172 | B1 | 1/2023 | Stevens et al. |
| 11,563,779 | B2 | 1/2023 | Copley et al. |
| 11,831,814 | B2 | 11/2023 | Lebeau et al. |
| 11,886,625 | B1 * | 1/2024 | Trzynadlowski ....... G06F 21/57 |
| 11,921,970 | B1 | 3/2024 | Hoover et al. |
| 2002/0158873 | A1 | 10/2002 | Williamson |
| 2007/0279484 | A1 | 12/2007 | Derocher et al. |
| 2009/0288007 | A1 | 11/2009 | Leacock et al. |
| 2009/0300516 | A1 | 12/2009 | Jerrard-Dunne et al. |
| 2010/0085416 | A1 | 4/2010 | Hegde et al. |
| 2011/0107270 | A1 | 5/2011 | Wang et al. |
| 2012/0192088 | A1 | 7/2012 | Sauriol et al. |
| 2012/0204118 | A1 | 8/2012 | Lefar et al. |
| 2012/0246582 | A1 | 9/2012 | Leacock et al. |
| 2012/0317501 | A1 | 12/2012 | Milou |
| 2013/0024785 | A1 | 1/2013 | Van Wie |
| 2013/0031475 | A1 | 1/2013 | Maor et al. |
| 2014/0085316 | A1 | 3/2014 | Narayanan |
| 2014/0085406 | A1 | 3/2014 | Narayanan |
| 2014/0096036 | A1 | 4/2014 | Mohler |
| 2015/0215581 | A1 | 7/2015 | Barzuza et al. |
| 2015/0271220 | A1 | 9/2015 | Kleiner et al. |
| 2015/0279044 | A1 | 10/2015 | Kim et al. |
| 2016/0050394 | A1 | 2/2016 | Segal |
| 2016/0093108 | A1 | 3/2016 | Mao et al. |
| 2016/0132221 | A1 | 5/2016 | Lasser et al. |
| 2016/0155187 | A1 | 6/2016 | Paulrajan et al. |
| 2016/0156584 | A1 | 6/2016 | Hum et al. |
| 2016/0163070 | A1 | 6/2016 | Leacock et al. |
| 2016/0353062 | A1 | 12/2016 | Ono et al. |
| 2017/0257405 | A1 | 9/2017 | Lo et al. |
| 2017/0357917 | A1 | 12/2017 | Holmes et al. |
| 2018/0063480 | A1 | 3/2018 | Luks et al. |
| 2018/0095635 | A1 | 4/2018 | Valdivia et al. |
| 2018/0098059 | A1 | 4/2018 | Valdivia et al. |
| 2018/0101989 | A1 | 4/2018 | Frueh et al. |
| 2018/0139246 | A1 | 5/2018 | Rosenberg |
| 2018/0144212 | A1 | 5/2018 | Burgos et al. |
| 2018/0158246 | A1 | 6/2018 | Grau et al. |
| 2018/0227138 | A1 | 8/2018 | Faulkner et al. |
| 2018/0234671 | A1 | 8/2018 | Yang et al. |
| 2018/0356885 | A1 | 12/2018 | Ross et al. |
| 2019/0042640 | A1 | 2/2019 | Valeski |
| 2019/0045157 | A1 | 2/2019 | Venshtain et al. |
| 2019/0058870 | A1 | 2/2019 | Rowell et al. |
| 2019/0130629 | A1 | 5/2019 | Chand et al. |
| 2019/0171354 | A1 | 6/2019 | Dascola et al. |
| 2019/0253667 | A1 | 8/2019 | Valli |
| 2019/0279424 | A1 | 9/2019 | Clausen et al. |
| 2019/0310757 | A1 | 10/2019 | Lee et al. |
| 2019/0325658 | A1 | 10/2019 | Park et al. |
| 2019/0327392 | A1 | 10/2019 | Sarkar |
| 2019/0340828 | A1 | 11/2019 | Harvey |
| 2019/0346522 | A1 | 11/2019 | Botnar et al. |
| 2019/0371060 | A1 | 12/2019 | Energin et al. |
| 2019/0379750 | A1 | 12/2019 | Zamora Duran et al. |
| 2020/0090350 | A1 | 3/2020 | Cho et al. |
| 2020/0099891 | A1 | 3/2020 | Valli et al. |
| 2020/0118342 | A1 | 4/2020 | Varshney et al. |
| 2020/0128033 | A1 | 4/2020 | Kawakita |
| 2020/0142475 | A1 | 5/2020 | Paez et al. |
| 2020/0154166 | A1 | 5/2020 | Rakshit et al. |
| 2020/0279411 | A1 | 9/2020 | Atria et al. |
| 2020/0296327 | A1 | 9/2020 | Karafin et al. |
| 2020/0329214 | A1 | 10/2020 | Ahn et al. |
| 2020/0371665 | A1 | 11/2020 | Clausen et al. |
| 2020/0396266 | A1 | 12/2020 | Goel |
| 2021/0019541 | A1 | 1/2021 | Wang et al. |
| 2021/0029326 | A1 | 1/2021 | Oyman et al. |
| 2021/0099433 | A1 * | 4/2021 | Soryal ................ H04N 21/8166 |
| 2021/0120066 | A1 | 4/2021 | Oyman et al. |
| 2021/0149627 | A1 | 5/2021 | Jang et al. |
| 2021/0248727 | A1 | 8/2021 | Fisher et al. |
| 2021/0263593 | A1 | 8/2021 | Lacey |
| 2021/0281802 | A1 | 9/2021 | Kirisken |
| 2021/0336784 | A1 | 10/2021 | Athlur et al. |
| 2021/0385412 | A1 * | 12/2021 | Matula ..................... H04N 7/15 |
| 2021/0390767 | A1 | 12/2021 | Johnson et al. |
| 2021/0392175 | A1 | 12/2021 | Gronau et al. |
| 2021/0392296 | A1 | 12/2021 | Rabinovich et al. |
| 2021/0407520 | A1 | 12/2021 | Neckermann et al. |
| 2022/0084288 | A1 | 3/2022 | LeBeau et al. |
| 2022/0086167 | A1 | 3/2022 | LeBeau et al. |
| 2022/0086205 | A1 | 3/2022 | LeBeau et al. |
| 2022/0103386 | A1 | 3/2022 | Jensen |
| 2022/0109810 | A1 | 4/2022 | Kancharlawar et al. |
| 2022/0116431 | A1 | 4/2022 | Mayfield et al. |
| 2022/0150083 | A1 | 5/2022 | Faulkner |
| 2022/0157342 | A1 | 5/2022 | Kliushkin et al. |
| 2022/0172444 | A1 | 6/2022 | Lebeau et al. |
| 2022/0174108 | A1 | 6/2022 | Oyman |
| 2022/0200979 | A1 | 6/2022 | Wenzel |
| 2022/0229535 | A1 | 7/2022 | Evangelista et al. |
| 2022/0385490 | A1 | 12/2022 | Lin et al. |
| 2022/0417308 | A1 | 12/2022 | Oyman |
| 2023/0082461 | A1 | 3/2023 | Gal et al. |
| 2023/0198745 | A1 * | 6/2023 | Vansteenkiste ....... H04W 12/02 713/168 |
| 2023/0281929 | A1 | 9/2023 | Atlas et al. |
| 2023/0412724 | A1 | 12/2023 | Ma et al. |
| 2024/0214524 | A1 | 6/2024 | Lebeau et al. |

OTHER PUBLICATIONS

International Search Report and Written Opinion for International Application No. PCT/US2021/038992, mailed Oct. 29, 2021, 16 pages.

Unknown., "A Better Way to Meet Online," Gather, https://www.gather.town/ , Last Accessed Oct. 11, 2021.

Jikadra R., et al., "Video Calling with Augmented Reality Using WebRTC API," 2019 6th International Conference on Computing for Sustainable Global Development (INDIACom), Mar. 13, 2019, 5 pages.

Shanmugam M., et al., "Research Opportunities on Virtual Reality and Augmented Reality: A Survey," 2019 IEEE International Conference on System, Computation, Automation and Networking (ICSCAN), Mar. 29, 2019, 6 pages.

International Search Report and Written Opinion for International Application No. PCT/US2023/012192, mailed May 4, 2023, 8 pages.

Baxter D.B., "Creating Treemap Chart Using JavaScript," AnyChart News, Aug. 1, 2019, 12 Pages.

EBook Reader, "Viewing Popular Highlights on Kindles," [Online], Feb. 15, 2018 [Retrieved on Aug. 5, 2020], 11 Pages, Retrieved from Internet: URL: https://blog.the-ebook-reader.com/2018/02/15/viewing-popular-highlights-on-kindles/.

Garofalakis J., et al., "Personalized Web Search by Constructing Semantic Clusters of User Profiles," Springer Link [Online], 2008 [Retrieved on Aug. 5, 2020], 6 Pages, Retrieved on Internet: URL: https://link.springer.com/chapter/10.1007/978-3-540-85565-1_30.

Gauch S., et al., "Ontology-Based User Profiles for Search and Browsing," [Online], 2002 [Retrieved on Aug. 5, 2020], 6 Pages, Retrieved from Internet: URL: https://www.semanticscholar.org/

(56) References Cited

OTHER PUBLICATIONS paper/Ontology-Based-User-Profiles-for-Search-and-Gauch-Chaffee/93af7304757a9beabb10bfbca55b04045bf2ef90.

International Preliminary Report on Patentability for International Application No. PCT/US2022/042452, mailed Mar. 14, 2024, 6 pages.

"Pinterest Communities What are they and How can you Join?," Ivory Mix, Aug. 5, 2020, 19 Pages, Retrieved from Internet: URL: https://ivorymix.com/pinterest-communities/.

Schmeiser L., "Microsoft Analytics Aims to Analyze Worker Habits, Point to More Productivity," [Online], Jul. 5, 2017 [Retrieved on Aug. 5, 2020], 3 Pages, Retrieved from Internet: URL: https://www.itprotoday.com/office-365/microsoft-analytics-aims-analyze-worker-habits-point-more-productivity.

Semantic Arts, "White Paper: Semantic Profiling," [Online], Jan. 21, 2015 [Retrieved on Aug. 5, 2020], 11 Pages, Retrieved from Internet: https://www.semanticarts.com/white-paper-semantic-profiling/.

Song X., et al., "A Scalable and Statistically Robust Beam Alignment Technique for mm-Wave Systems," May 8, 2018, 13 pages.

Tarpani G., "What is Google Wave?," Macworld [Online], Feb. 22, 2010 [Retrieved on Aug. 5, 2020], 7 Pages, Retrieved from Internet: URL: https://www.macworld.com/article/1146555/whatisgooglewave.html.

Wanders I., "Build your Own Knowledge Graph: From Unstructured Dark Data to Valuable Business Insights," Vector Consulting [Online], Oct. 18, 2018 [Retrieved on 2020-80-05], 8 Pages, Retrieved from Internet: https://medium.com/vectrconsulting/build-your-own-knowledge-graph-975cf6dde67f.

Wikipedia, The Free Encyclopedia, "Google Wave," [Online], Aug. 5, 2020, 1 Page, Retrieved from Internet: URL: https://simple.wikipedia.org/wiki/Google_Wave.

Wikipedia, The Free Encyclopedia, "Treemapping," Aug. 5, 2020, 13 Pages, Retrieved from Internet: URL: https://en.wikipedia.org/wiki/Treemapping.

Wikipedia: The Free Encyclopedia, "Unconference," Aug. 5, 2020, 3 Pages, Retrieved from Internet: URL: https://en.wikipedia.org/wiki/Unconference.

International Preliminary Report on Patentability for International Application No. PCT/US2023/012192, mailed Aug. 15, 2024, 6 pages.

\* cited by examiner

OBSCURING OBJECTS IN DATA STREAMS USING MACHINE LEARNING

TECHNICAL FIELD

The present disclosure is directed to obscuring objects in data streams using machine learning.

BACKGROUND

The pace of technology has increased the world's connectivity. For example, audio connections, such as phone calls, have evolved into audio and video connections, such as video calls. These deeper connections present new challenges, such as privacy concerns and more generally issues that relate to user control over the aspects of their life that they share. Further, technology's progression towards increased connectiveness continues through artificial reality and other frontiers. Conventional systems fail to address user concerns for sharing and privacy in this increasingly connected environment.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
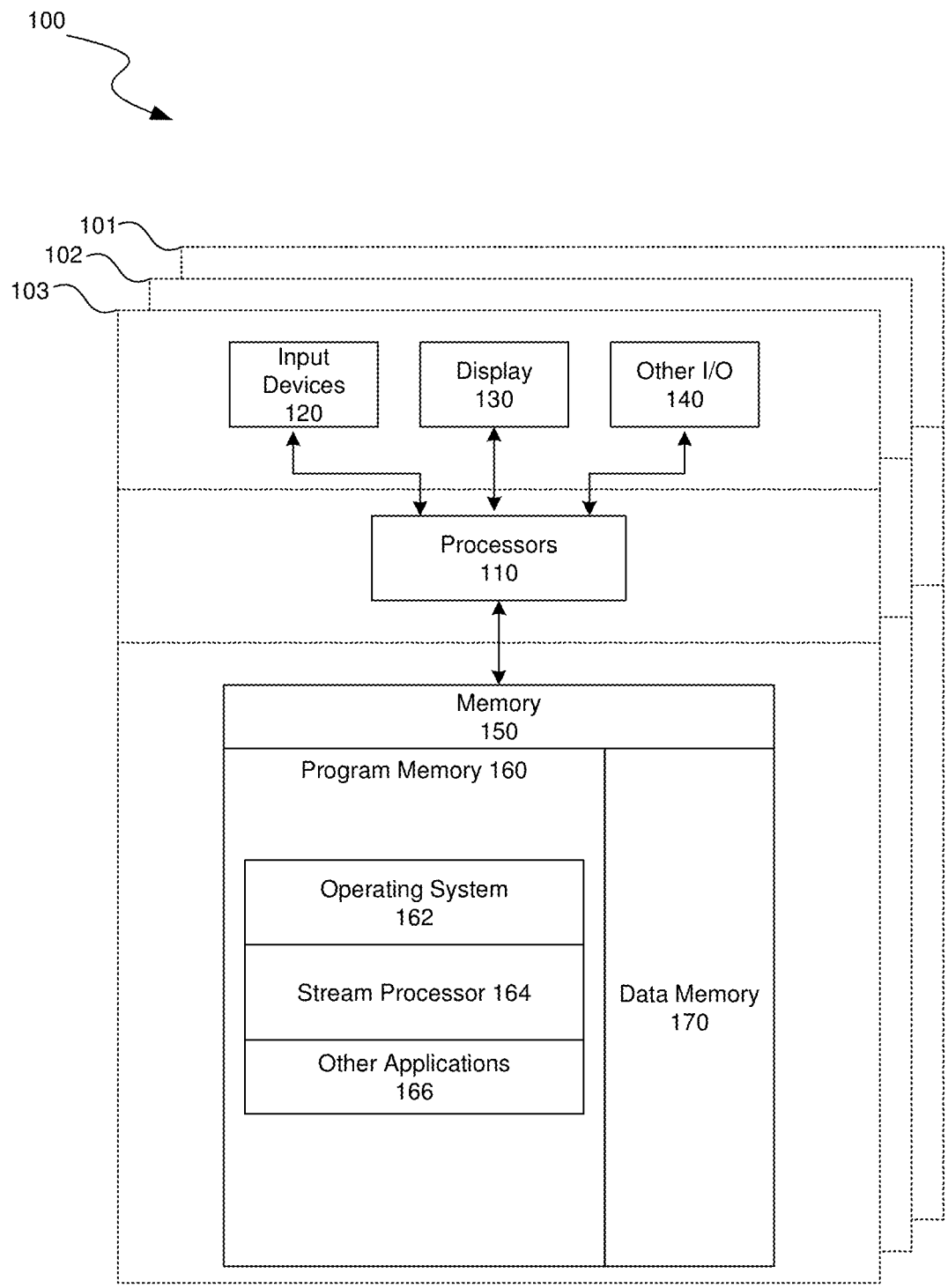
FIG. 1 is a block diagram illustrating an overview of devices on which some implementations of the present technology can operate.

Aspects of the present disclosure are directed to a data stream processing system for obscuring objects in data streams using machine learning. Conventionally, data streams can be captured at a client device, such as by a camera connected to an Internet connected client device. These data streams (e.g., video stream) can then be shared with other users/client devices, such as through a video conference, video call, online game (e.g., massively multi-play online game), artificial reality session, or other sharing medium. Using a captured video stream as an example, the video stream may include aspects of a user's personal life, such as food and beverage products, clothes, aspects of the user's social life (e.g., guests, living situation), decor, and other suitable personal aspects.

Implementations define user preferences for objects shared in data streams so that a user can actively control aspects that are shared. In the video stream example, user preferences can be defined for objects within a field of view that is shared with other users. The user preferences can include explicit definitions from the user, such as object categories and the sharing rules for these object categories and/or object locations and the sharing rules for these object locations. In another example, a set of object sharing rules can be learned for the user and/or suggested to the user, and the user can select or edit these object sharing rules.

Implementations obscure recognized objects in data streams based on the definitions in the user preferences. For example, machine learning model(s) can be used to recognize and categorize objects in a client data stream, such as objects contained in a user's video stream for a video conference. Machine learning models can be deployed that recognize objects and categorize objects into one or more of a plurality of predetermined object categories (e.g., clothing, food, beverage, house decor, a person, a pet, personal documents, furniture, alphanumeric characters, brands or logos, and the like).

In some implementations, the defined user preferences include rules for sharing object categories. For example, the rules may define that food and beverage objects should not be displayed will clothing objects should be displayed. In some implementations, a list of object categories that should not be displayed can be defined in the user preferences. In another example, a list of object categories that should be displayed can be defined, and all other objects not on this list should not be displayed. In another example, a rule can include a predefined region in which objects should be displayed and outside of which objects should not be displayed. The user preferences and object sharing rules can be defined using input received from the user.

Obscuring an object in some implementations can include blocking, blurring, or filtering the objects visual display when the video stream is displayed. Given the video conferencing example, the field of view of a camera on a user's device may capture food and beverage objects, however these objects can be obscured (e.g., blacked out, blurred, or otherwise filtered) based on the user's object sharing rules when the user's video stream is displayed to other users on the video conference. In some implementations, the user preferences can include different object sharing rules for different users (or user groups). For example, food and beverage objects may be obscured when the user's video stream is displayed to a first group of users (e.g., those classified as co-workers) and may not be obscured when the user's video stream is displayed to a second group of users (e.g., those classified as friends).

In some implementations, a session type can be defined or learned, such as a type of video conference or artificial reality session, and user preferences and defined object sharing rules specific to the session type can be used. For example, a business video conference may have sharing rules that obscure more objects than a personal video conference.

In some implementations, user preferences and sharing rules specific to user participants and/or session types can be learned. For example, the input received from a principal user that defines object sharing rules and the session information (e.g., session type, user participants in the session) can be stored. Based on the stored instances of principal users (e.g., users that define the object sharing rules), object sharing rules, session information, and user participants in the sessions, a machine learning model (or other model) can learn tendencies from the data.

For example, using data for a single principal user, profiles that group object sharing rules with session types and/or user participants can be learned. In this example, a business profile can be learned based on stored data that reflects how a principal user defines object sharing rules when a session includes business user participants and a personal profile can be learned that reflects how a principal user defines object sharing rules when a session includes personal user participants. Prior to a session (e.g., video conference or shared artificial reality session) with a set of user participants, a profile that includes a group of object sharing rules can be suggested to the principal user for the session based on the user participants (or based on the presence of at least one user participant).

In another example, using data for multiple principal users, object sharing rules and/or groupings of object sharing rules (e.g., profiles) can be learned and suggested for a given principal user. In this example, the given principal user can have little or no historic/stored object sharing rules data. Machine learning model(s) can learn trends among user features and object sharing rules (or profiles) from the stored instances of principal users, object sharing rules, session information, and user participants in the sessions. The machine learning model(s) can suggest object sharing rules or profiles to a principal user based on the user's features and the learned trends.

In some implementations, the captured/processed data stream can be a data stream related to a shared artificial reality or extra reality session. Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

In existing systems for sharing data streams, user control over sharing objects in image capturing devices' field of view is coarse and limited. For example, a virtual background can be implemented for conventional video conferencing or artificial reality sessions, however the virtual background can be impersonal and undesirable because almost all objects other than the user are conventionally hidden by the virtual background. Other conventional systems permit blurring of a user's background. Here too the blurred background can be impersonal and undesirable because almost all objects other than the user are conventionally blurred. Further, such extensive hiding or blurring can incorrectly capture parts of the user, disrupting the communication.

The data stream processing system described herein provides granular control over sharing controls for objects in shared data streams that provide significant user value. For example, the conventional options leave a user to either share almost no objects in a field of view (e.g., by using a conventional background or blur) or every object in the field of view. Implementations of the object obscuring system provide the user low level access to define how individual objects, object categories, or object locations should be displayed in the shared data session. Such control allows the user to share certain personal aspects in a data stream (e.g., video conference or shared artificial reality session) while maintaining and ensuring privacy. This personalization can encourage connection among users in a shared data stream session, as the users can each gain visibility into portions of the other users' personal space without violating any privacy boundaries. Furthermore, by using models that recognize particular data objects/object types to obscure, it is less likely that portions of the user will be selected for obscuring, thus providing a more accurate and natural communication.

Several implementations are discussed below in more detail in reference to the figures. FIG. 1 is a block diagram illustrating an overview of devices on which some implementations of the disclosed technology can operate. The devices can comprise hardware components of a computing system 100 that facilitates the processing of data streams to obscure objects. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, stream processor 164, and other application programs 166. Memory 150 can also include data memory 170 that can include virtual objects definitions, application definitions, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
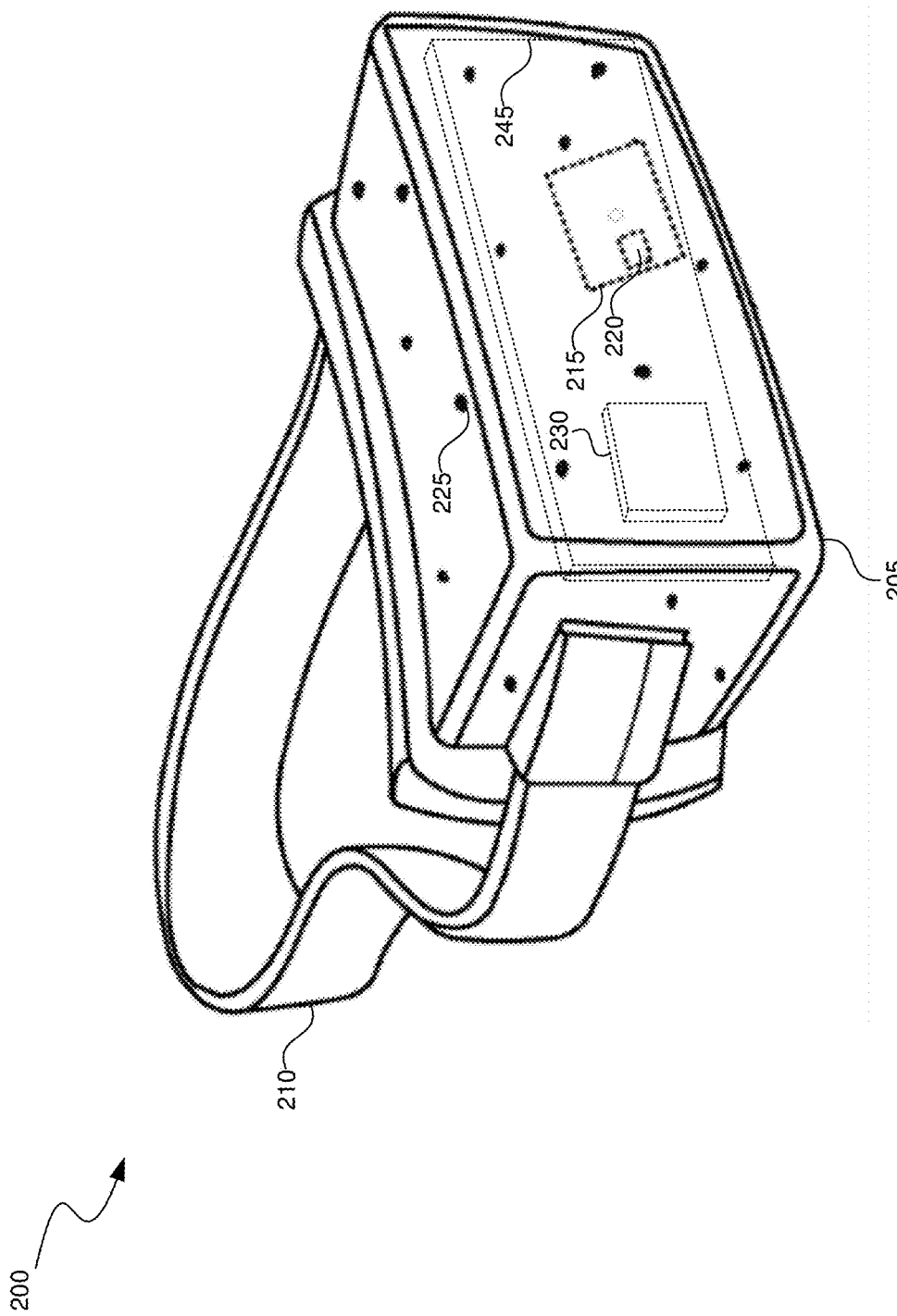
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
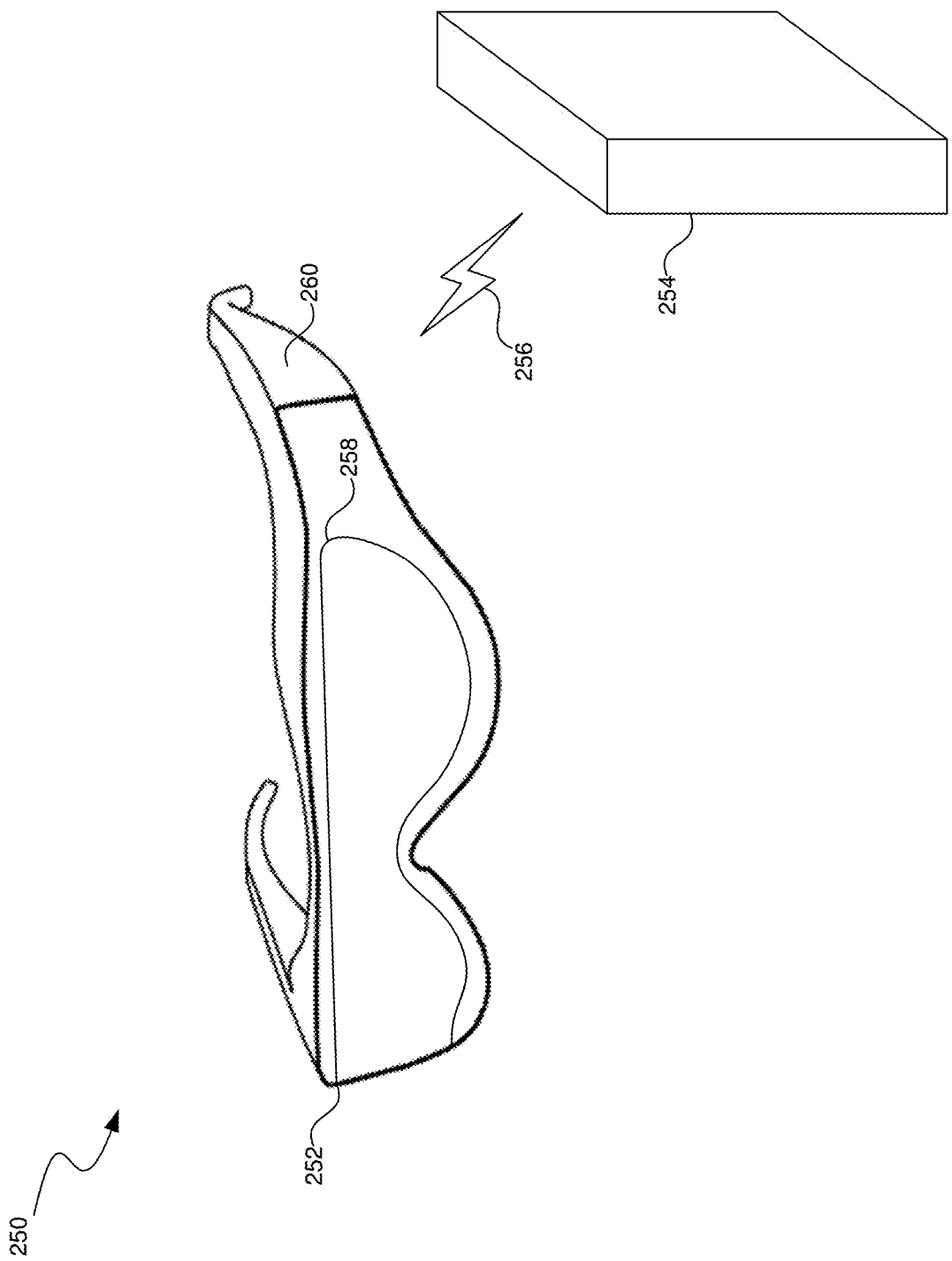
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
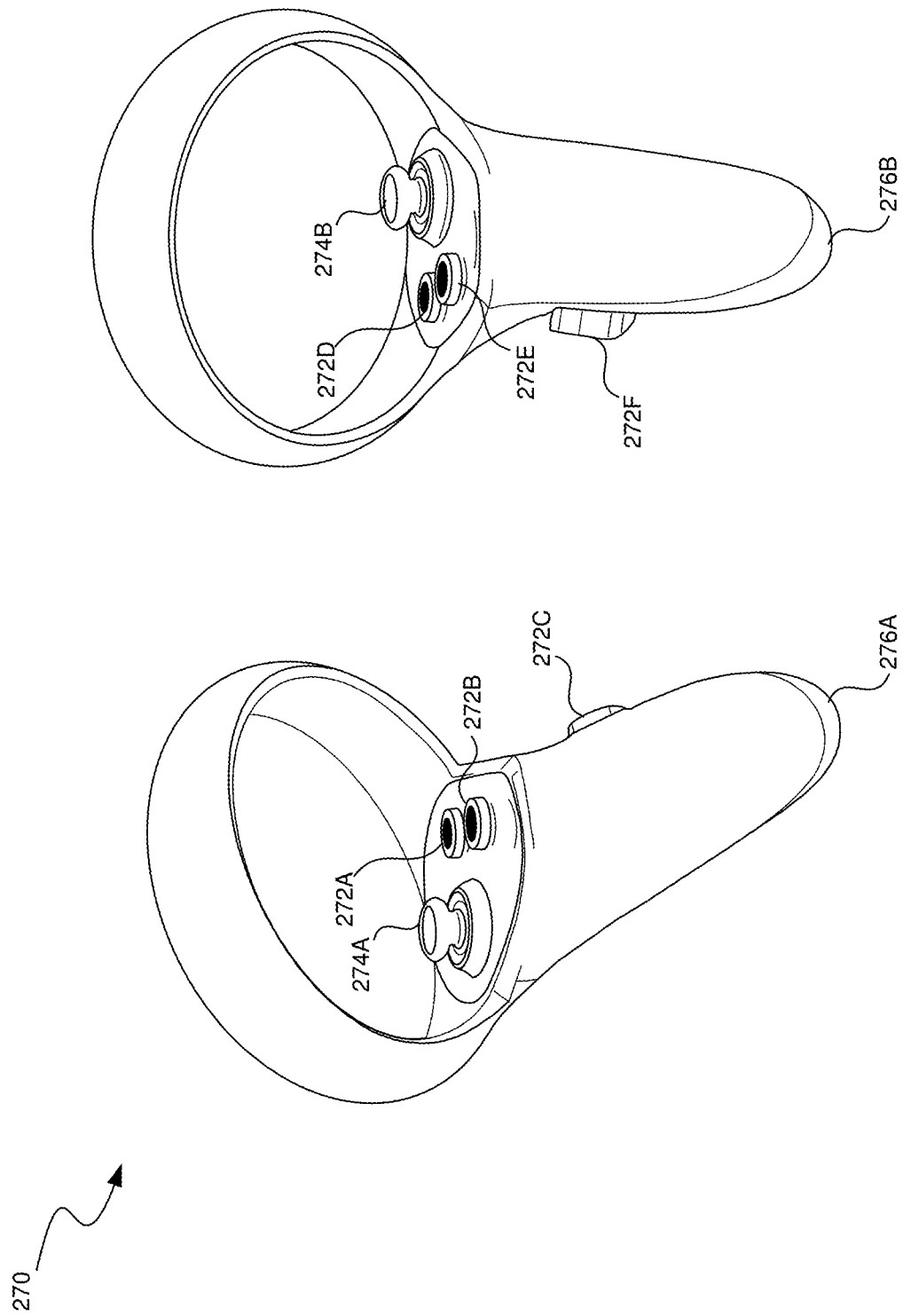
FIG. 2C is a wire diagram illustrating controllers which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
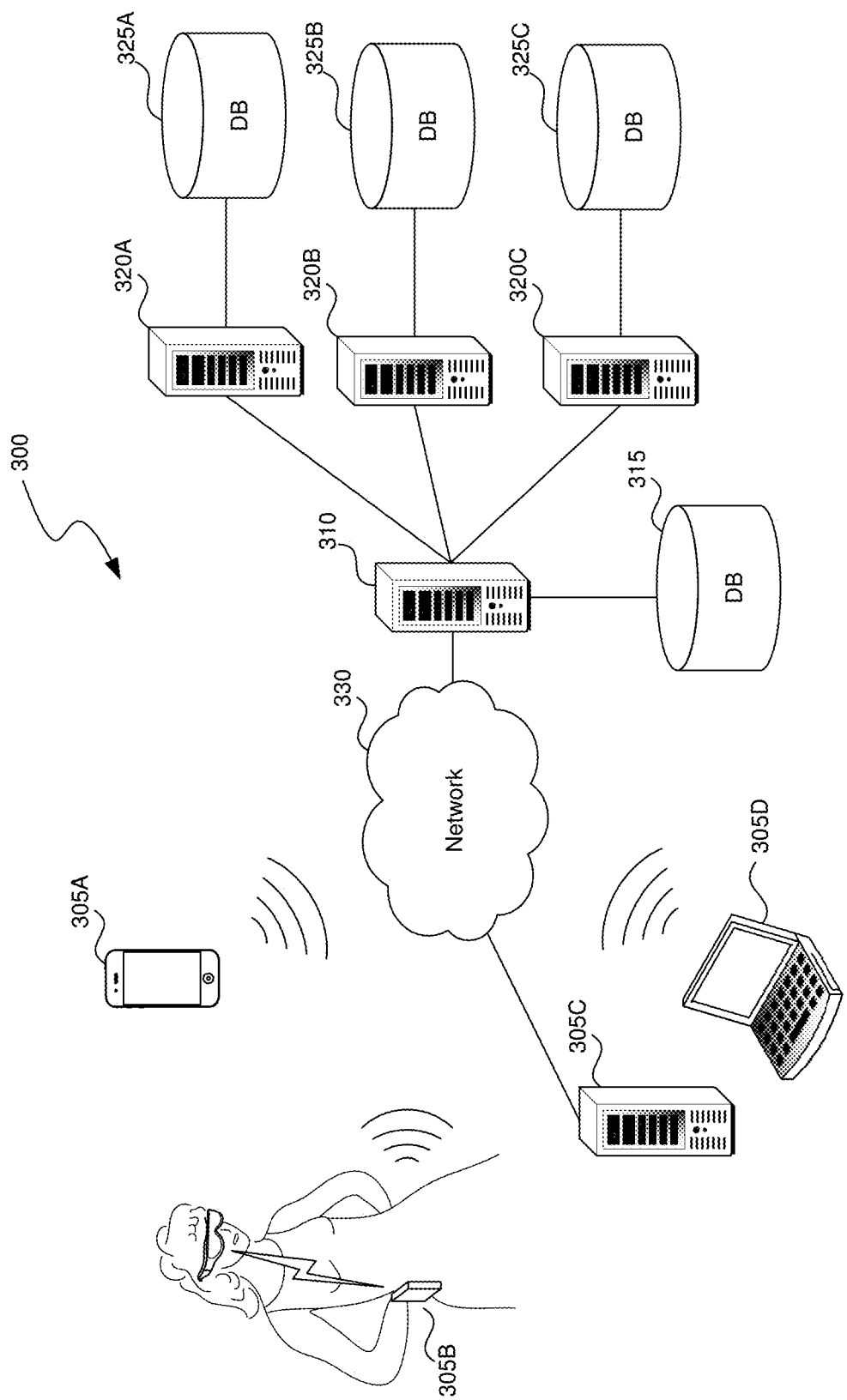
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc,), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system, Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their personalized avatar) with objects or other avatars in an artificial reality environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide an artificial reality environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 4:
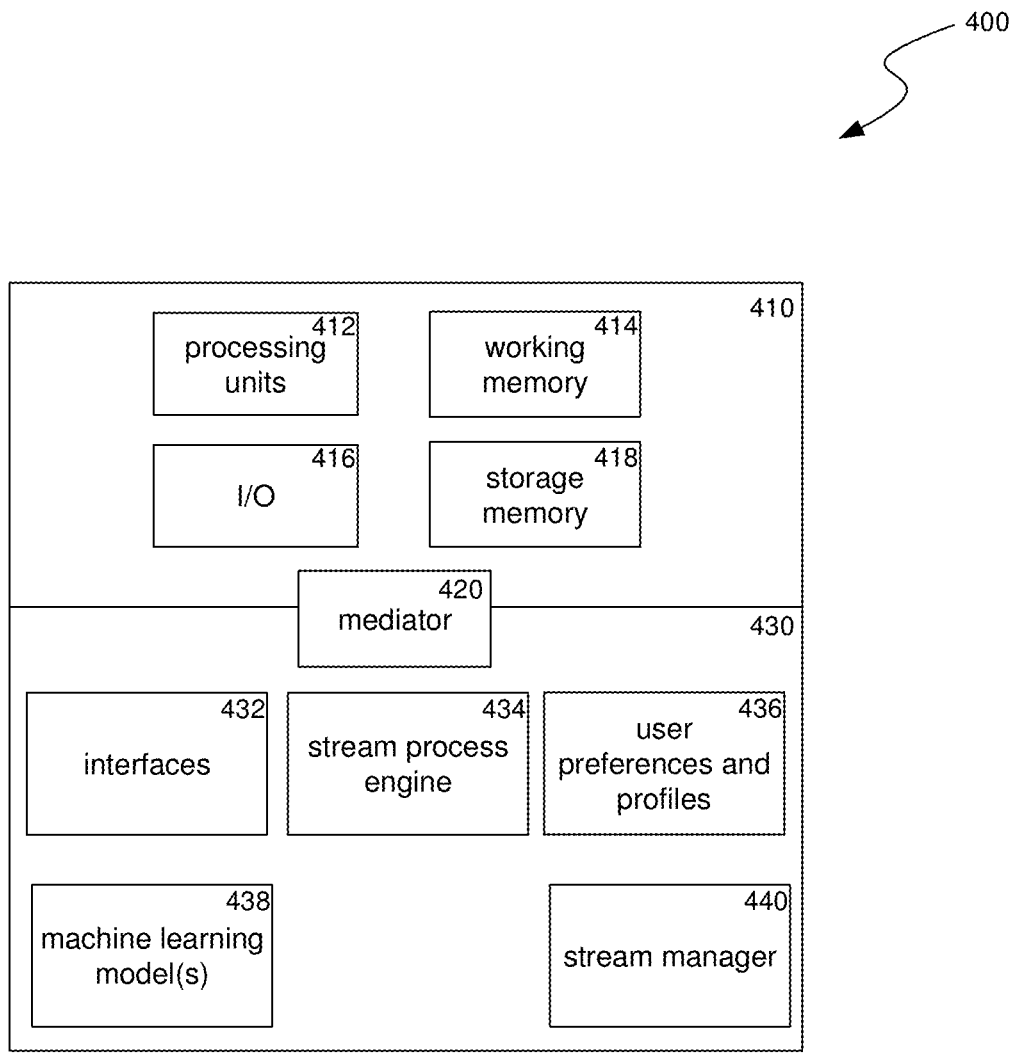
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for obscuring objects in data streams using machine learning. Specialized components 430 can include streaming process engine 434, user preferences and profiles 436, machine learning model(s) 438, stream manager 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Stream process engine 434 can process data streams, such as video streams captured by one or more cameras. For example, stream process engine 434 can recognize objects in data streams using one or more machine learning model(s) 438 trained for object recognition. In another example, stream process engine 434 can categorize recognized objects using one or more machine learning model(s) 438 trained for object categorization.

The recognized (and in some implementations categorized) objects can be compared to user preferences and profiles 436 to determine whether one or more of the objects should be obscured. For example, user preferences and profiles 436 can include object sharing rules for a user that define whether an object in a data stream should be displayed in a shared data stream or not. When one or more object sharing rules define that a recognized object should not be displayed in a shared data stream, stream process engine 434 can obscure the object.

Stream process engine 434 can track one or more of the recognized (and categorized) objects using one or more machine learning model(s) 438 configured to track objects. If the object sharing rules define that the tracked object should not be displayed in a shared data stream, stream process engine 434 can obscure the tracked object by overlapping the object's location with a blocking object, field, or mask, blurring or obstructing the object by applying a filter over its location, or can otherwise obscure the tracked object using its location. As the data stream continues, stream process engine 434 can continue to track and obscure the object using its location. Additional details on stream process engine 434 are provided below in relation to block(s) 704, 706, and 708 of FIG. 7 and element 804 of FIG. 8.

User preferences and profiles 436 can store user preferences that include rules for sharing objects in a data stream (e.g., video stream) and groups of object sharing rules, or profiles. An example object sharing rule defines an object category (e.g., clothes) and a display status for the object category in a shared data stream (e.g., display or do not display). Example object categories include clothing, food, beverage, house décor, a person, a pet, personal documents, furniture, alphanumeric characters, brands, logos, or any other suitable object category.

Another example object sharing rule can define a region, such as a predefined region or volume of space within the field of view of one or more cameras of a client system (e.g., XR system, personal computing device) and a display status for the objects located within or outside the region (e.g., display or do not display). In this example, objects located within the region can be displayed while objects located outside the region can be obscured. Some implementations may include a rule that defines a list of permitted objects, such as a list of specific objects with specific object definitions predetermined for display in a shared stream (e.g., a whitelist). In this example, any object not included in the list of permitted objects is obscured.

In some implementations, user preferences and profiles 436 can store different object sharing rules for different users and/or streaming session types. For example, a streaming data session can be shared among a first, second, and third user, where first rules define object sharing between the first user and the second user, and second rules define object sharing between the first user and the third user. The first rules may define that a particular object category is not for display to the second user while the second rules may permit display of the object category to the third user. In this example, when the first user's streaming data session includes an object of the particular object category, the display of the first user's streaming data session to the second user (e.g., using a client device associated with the second user) will have an obscured object while the display of the first user's streaming data session to the third user (e.g., using a client device associated with the third user) will include the object (without being obscured).

In some implementations, user preferences and profiles 436 can store different object sharing rules for different streaming session types. Given the example of a video conference, a first streaming session type can be a business session while a second streaming session type can be a personal session. The streaming session type can be determined based on the user participants in the streaming session, by user input/selection, or through any other suitable means. First rules can define object sharing for the first streaming session type and second rules can define object sharing for the second streaming session type. For example, a user may find it more appropriate to obscure more objects in a business session than a personal session. According, when compared to the second rules, the first rules may define more object categories that should not be displayed in a shared stream, fewer objects explicitly permitted for display in a shared stream, and/or a defined region outside of which all objects should not be displayed in a shared stream. In some implementations, the first rules and second rules can be different profiles, or different sets of object sharing rules. Additional details on user preferences and profiles 436 are provided below in relation to block(s) 602 and 604 of FIG. 6, block(s) 706 and 708 of FIG. 7, and element 804 of FIG. 8.

Machine learning model(s) 438 can be any model suitable to process data streams (e.g., video streams and/or artificial reality sessions) or any model suitable to learn trends from historic data and recommend object sharing rules. For example, one or more machine learning models 438 can be configured or trained for object recognition, object categorization, object tracking, or a combination of these. Machine learning model(s) 438 can be capable of video processing and/or processing of data captured by image capturing devices (e.g., multiple cameras).

In some implementations, historic data about past streaming data sessions, users, and object sharing rules can be stored and used to train machine learning model(s) 438. For example, a principal user (e.g., the user for which sharing rules are implemented) can select or define sharing rules for a given streaming session with a given set of participant users. The stored data for this historic streaming data session can include one or more of: features of the principal user, features of the participant users, the object sharing rules implemented, a session type, timing for the session (e.g., time of day and/or day of week), and any other suitable contextual session information. The historic data can include several instances of stored data for past streaming data sessions.

One or more machine learning model(s) 438 can be trained using this historic data and the trained machine learning models can learn trends, such as relationships among principal user features, participant user features, session type, and implemented object sharing rules. The trained machine learning model(s) can be configured to generate predicted object sharing rules using a set of input features for a current or future streaming data session for a given user (e.g., principal user). For example, the input features can be features of the principal user, features of the user participants, timing features for the session (e.g., time of day and/or day of week), and any other suitable contextual data about the session. The generated object sharing rules can be a profile generated for the principal user and the current or future streaming data session. For example, the generated profile can be suggested to the principal user and, when accepted, the implemented object sharing rules for the principal user during the streaming session will be the generated profile's object sharing rules.

In some implementations, stored data can include past streaming sessions for a particular user. For example, using historic data stored for a single principal user, one or more machine learning model(s) 438 can learn profiles that group object sharing rules with session types and/or user participants. In this example, a first profile can be learned based on stored data that reflects how a principal user defines object sharing rules when a session includes business user participants and a second profile can be learned that reflects how a principal user defines object sharing rules when a session includes personal user participants. Prior to a session (e.g., video conference or shared artificial reality session) with a set of user participants, a profile (e.g., set of object sharing rules) can be suggested to the principal user for the session based on the user participants and/or session type. Additional details on machine learning model(s) 438 are provided below relation to block(s) 704 of FIG. 7 and element 804 of FIG. 8.

Stream manager 440 can manage a streaming data session with multiple variants, such as a streaming data session with different object sharing rules for different participant users. In this example, different user participants are displayed different versions of a principal user's streaming data session, as some user participants may be displayed the principal user's streaming data session with a given object being obscured while other user participants maybe be displayed the principal user's streaming data session without the given being obscured (e.g., with the given object being unobscured). Stream manager 440 can manage the different versions of the streaming data sessions such that the principal user's object sharing rules are implemented. Additional details on stream manager 440 are provided below in relation to element 804 of FIG. 8.

Figure 5:
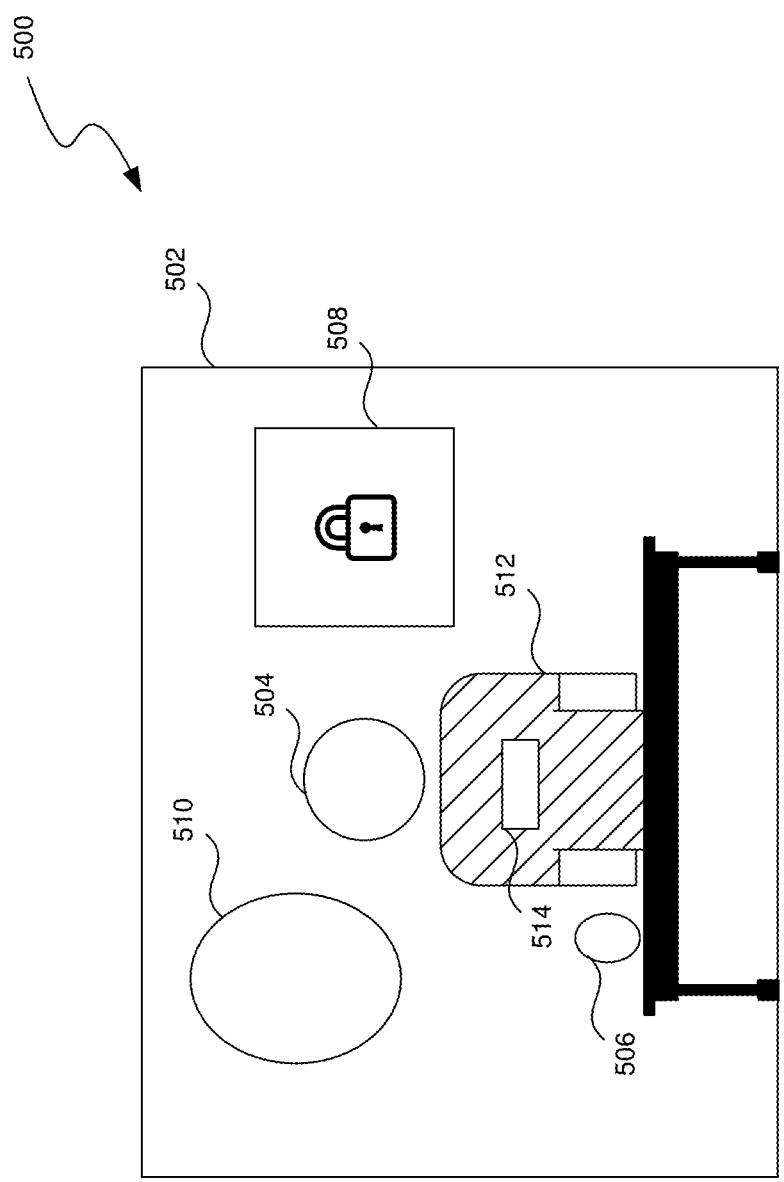
FIG. 5 is a conceptual diagram illustrating a field of view of a data capturing device.

A streaming data session can be captured by one or more image capturing devices (e.g., cameras) located at a client system (e.g., XR system or personal computing device). FIG. 5 is a conceptual diagram illustrating a field of view of a data capturing device. Diagram 500 includes field of view 502, user 504, objects 506, 508, and 510, and composite objects 512 and 514. For example, one or more image capturing devices can be pointed at user 504 such that objects 506, 508, 510, and composite objects 512 and 514 are captured in field of view 502 of the image capturing devices.

In some implementations, user 504 can provide input that represents the user's object sharing rules for a shared streaming data session. For example, a user interface can be displayed for user 504 with a processed version of the streaming data captured by the one or more image capturing devices. The processed version of the streaming data can include indicators (e.g., outlines) around objects 506, 508, 510, and composite objects 512 and 514 that indicate that these items are recognized objects in field of view 502.

User 504 can select an individual object to provide input that includes object sharing rules that control how the objects are displayed in a shared streaming data session. For example, user 504 may have selected object 508 and provided input that the object should not be displayed in a shared streaming data session. As a result, object 508 can be obscured, such as by displaying a blocking object over the object and/or an image that indicates the sharing rule for the object (e.g., the displayed lock). In some implementations, the recognized object can have a category, and the sharing rules for object 508 can be defined for any object within the category. Similarly, user 504 can provide input that defines object sharing rules for objects 506 and 510.

Composite objects 512 and 514 can be layered objects. For example, composite object 512 can be categorized as a clothing object and composite object 514 can be categorized as an alphanumeric object. In this example, user 504 can be wearing a shirt with text, the shirt can be recognized as a clothing object and the text can be recognized as an alphanumeric object. User 504 can select composite object 512 and define object sharing rules for clothing objects and/or select composite object 514 and define object sharing rules for alphanumeric objects. For example, user 504 may provide input that defines that alphanumeric objects should not be displayed in a shared streaming data session, but that permits displaying clothing objects. Here, composite object 512 would not be obscured while composite object 514 would be obscured. In some implementations, any alphanumeric objects (whether part of other recognized objects or not) would also be obscured.

An example technique for obscuring composite object 514 is to display a blocking object over the tracked location of composite object 514, where the color of the blocking object matches a primary color of the composite object 512 (e.g., the object that contains composite object 514). For example, a color of composite object 512 can be determined (e.g., by a configured/trained machine learning model), and the generated blocking object can be configured to match the determined color.

In another example, user 504 may provide input that defines that clothing objects should not be displayed in a shared data streaming session, but that permits displaying alphanumeric objects. Here, composite object 512 would be obscured in a shared steaming data session, and because composite object 514 is layered on composite object 512, composite object 514 would be effectively obscured. However, in some implementations, other alphanumeric objects (whether part of other recognized objects or not) would not be obscured while other clothing objects would be obscured.

In some implementations, user 504 can provide input that adds one or more of objects 506, 508, 510, and composite objects 512 and 514 to a whitelist, or a list of objects permitted to be displayed in a shared streaming data session. In this example, the specific object is permitted for display, and each object in the list of objects can be stored with specific object definitions. For example, the specific object definitions can include the object category, a physical characteristic for the object, and/or a location for the object. The physical characteristic for the object can include object size, object color, or other suitable physical characteristics. The object size can be a general object size (e.g., extra small, small, medium, large), a determined object size (e.g., determined size in a given unit, such as pixel size, estimated real-world size, and the like), or any other suitable object size. Object color can be the object's primary color or a list of colors. As a result, during a shared streaming data session only the objects put on the permitted list by user 504 will be displayed and other objects will be obscured.

For example, one or more machine learning model(s) can process the data stream to recognize objects present in the stream (e.g., by performing image recognition/object recognition functionality) and a stream process engine can compare recognized categories, locations, and/or physical characteristics of the recognized objects to the specific object definitions stored in the permitted list. Recognized objects found on the list can be displayed unobscured while recognized objects not found on the list can be obscured. This implementation provides a fail safe for unexpected circumstances, such as people, pets, or other objects entering field of view 502 unexpectedly. These unexpected objects can be obstructed, and thus user privacy can be maintained.

A "machine learning model," as used herein, refers to a construct that is trained using training data to make predictions or provide probabilities for new data items, whether the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an image occurring based on an analysis of a large corpus of images. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, embodiments of machine learning models can be neural networks with multiple input nodes that receive data streams (e.g., streaming video from one or more cameras, a sequence of images, and the like) as input. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value for the input that, once the model is trained, can be used to derive meaningful information from the data streams, generate augments for the data stream, and/or perform other suitable data processing for the data streams. For example, a sequence of images (e.g., streaming video) can be processed to recognize objects, determine object characteristics (e.g., object category, object size, object color), track objects, and/or generate augments that alter the display of the sequence of images (e.g., generate a blocking element, mask, and/or filter to obscure an object). In some implementations, some neural networks, known as deep neural networks, can have multiple layers of intermediate nodes with different configurations, can be a combination of models that receive different parts of the input and/or input from other parts of the deep neural network, or are convolutions or recurrent—partially using output from previous iterations of applying the model as further input to produce results for the current input.

Those skilled in the art will appreciate that the components illustrated in FIGS. 1-5 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 6:
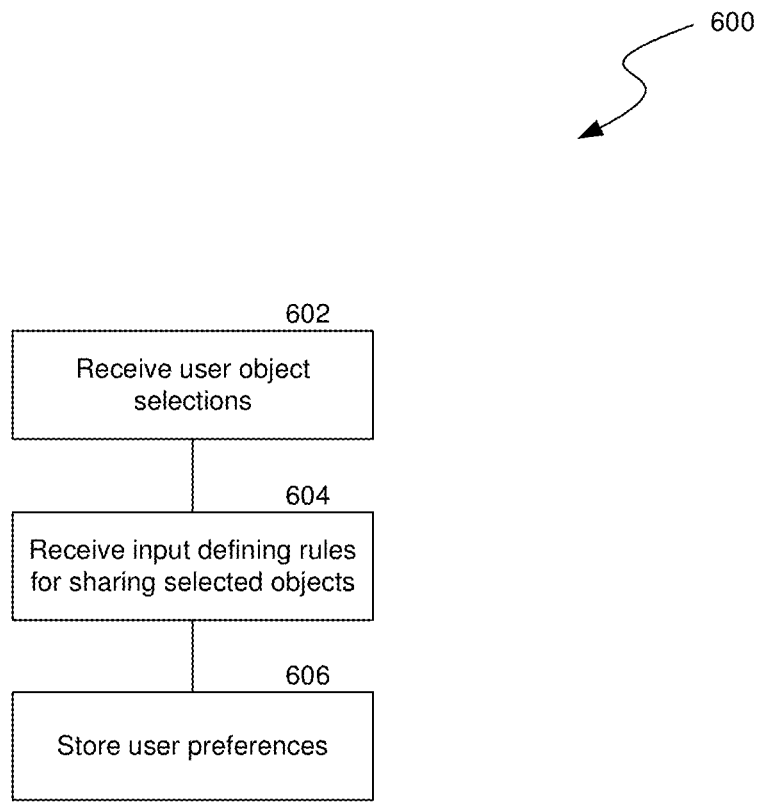
FIG. 6 is a flow diagram for receiving user preferences that define how to display objects in data streams.

FIG. 6 is a flow diagram for receiving user preferences that define how to display objects in data streams. In some implementations, process 600 can be used to define object sharing rules for a shared streaming data session. Process 600 can be triggered by the initiation of a shared streaming data session or prior to a shared streaming data session. In various implementations, process 600 can be performed on a client device that provides a preference selection UI to a user and/or can be performed on a server system that supports such a client device (e.g., for remote processing of streaming data).

At block 602, process 600 can receive user object selections. For example, a user can select objects using a user interface. The objects can be selected on a user interface that displays a field of view of a camera, as illustrated by diagram 500 of FIG. 5, on a user interface that includes pre-populated objects detected in a field of view of a camera, on a user interface with a dropdown for selecting object categories, or in any other suitable manner.

At block 604, process 600 receives input defining rules for sharing the selected objects. For example, object sharing rules for the selected objects can be defined by the input. The object sharing rules define whether the objects are displayed in a shared streaming data session or are obscured in the session.

For example, a selected object can have a category (e.g., alphanumeric characters) and the user can define a rule about whether the object category is displayed in a shared data stream (e.g., display or do not display). Example object categories include clothing, jewelry, food, beverage, house decor, a person, a pet, personal documents, furniture, alphanumeric characters, brands, logos, or any other suitable object category. Some implementations may include a rule that defines a list of permitted objects, such as a list of specific objects with specific object definitions predetermined for display in a shared stream (e.g., a whitelist). In this example, the user's object selection can be used to generate the list of permitted objects for display in a shared streaming data session, and any objects not on the list can be obscured. In some implementations, each selected object presented to the user has a specific object definition (e.g., determined by machine learning model(s)) and the selected object can be stored in the list with its specific object definition.

In another example, the objects selected by the user can be within a defined region, such as a predefined region or volume of space within the field of view of one or more cameras of a client system (e.g., XR system, personal computing device). The user can then define object sharing rules for objects located within the region and outside the region. In this example, the user can define that objects located within the region can be displayed in a shared streaming data session while objects located outside the region should not be displayed (e.g., should be obscured).

In some implementations, users can define different object sharing rules for different users and/or streaming session types. For example, a first user can define first object sharing rules that control object sharing between the first user and a second user, and second object sharing rules that control object sharing between the first user and a third user. The first rules may define that a particular object category is not for display to the second user while the second rules may permit display of the object category to the third user. In this example, when the first user's streaming data session includes an object of the particular object category, the display of the first user's streaming data session to the second user (e.g., using a client device associated with the second user) will include an obscured object (e.g. of the particular object category) while the display of the first user's streaming data session to the third user (e.g., using a client device associated with the third user) will include the object (without being obscured). In some implementations, the first rules and second rules can be different profiles, or different sets of object sharing rules.

In some implementations, user can define different object sharing rules for different streaming session types. Given the example of a video conference, a first streaming session type can be a business session while a second streaming session type can be a personal session. The user can define first rules that control object sharing for the first streaming session type and second rules that control object sharing for the second streaming session type. For example, the first rules may define object categories that should not be displayed in a shared stream, a list of objects explicitly permitted for display in a shared stream, and/or a defined region outside of which all objects should not be displayed in a shared stream. On the other hand, the second rules may broadly permit display of most or all objects in a shared data stream, as the user may be comfortable sharing personal aspects of the user's life in a personal streaming data session.

At 606, process 600 can store the defined object sharing rules as user preferences. For example, the stored user preferences can be accessed when a shared streaming data session (e.g., video conference, XR session, and the like) is initiated to control object sharing during the session.

Figure 7:
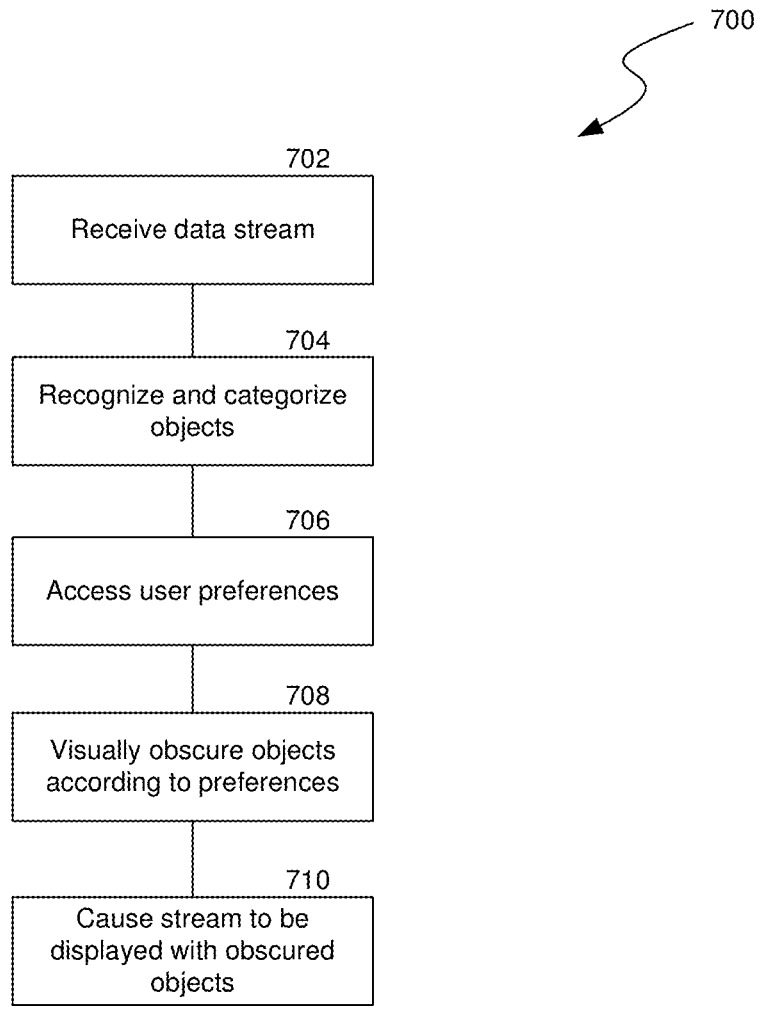
FIG. 7 is a flow diagram for obscuring objects in data streams using machine learning.

FIG. 7 is a flow diagram for obscuring objects in data streams using machine learning. In some implementations, process 700 can be used to control object sharing during a streaming data session for objects captured by an image capturing device associated with a user. Process 700 can be triggered by the initiation of a shared streaming data session. Process 700 can be performed on a client device of a user sending a data stream, on a client device of a user receiving a data stream, or on an intermediate server facilitating communication between such client devices.

At 702, process 700 can receive a data stream. For example, one or more image capturing devices (e.g., cameras) of a client system (e.g., XR system, personal computing device, and the like) can capture data in a field of view that includes several objects. In some implementations, the received data stream can be part of a shared streaming data session, such as a video conference, video call, XR session, or other suitable shared streaming data session.

At 704, process 700 can recognize and categorize objects within the data stream. For example, one or more machine learning models can be trained and/or configured to recognize objects and categorize the objects in the received data stream.

At 706, process 700 can access user preferences that include object sharing rules. For example, the user can define object sharing rules for objects that appear in the field of view captured by the image capturing device(s) of the client system. Process 600 of FIG. 6 can be used to define object sharing rules and/or different groups of object sharing rules (e.g., profiles).

In some implementations, the object sharing rules can define: an object category and the display status for the object category, an object location (e.g., within or outside a predefined region) and the display status for the object location, an object list of permitted objects (e.g., whitelist) with specific object definitions, and any other suitable rules. The recognized and categorized objects can be compared to the object sharing rules and one or more of the objects can be obscured when the object category, object location, or other suitable object parameter matches a rule that states the object should be obscured.

In some implementations, different sets of object sharing rules, or profiles, can be defined by a user. In this example, multiple profiles can be defined such that different sets of objects sharing rules are available to the user for implementation during a given shared streaming data session. For example, a first profile can control object sharing with a first participant user in a shared streaming data session and a second profile can control object sharing with a second participant user in a shared streaming data session. In another example, different object sharing rules can be defined for different streaming data session types. For example, a first profile can control object sharing in a personal streaming data session type and a second profile can control object sharing in a business streaming data session type.

In some implementations, the profile (or profiles) selected for a streaming data session can be selected by a user or automatically determined. For example, based on user participants in the session and stored information about the user participants (e.g., data about whether the participant is a social connection or a business connection), a session type can be automatically determined. In this example, a profile for the session type can be automatically selected for the streaming data session of the session type. In some implementations, the session type and/or session type profile can be learned by a model (e.g., machine learning model) using historic data. For example, historic shared data sessions, participant users, and object sharing rules (e.g., profiles) can be stored, and a model can learn associations between the participant users and the implemented object sharing rules.

In some implementations, the model can group (e.g., cluster) historic participants with historic object sharing rules implemented for the participants. This grouping of historic object sharing rules can be learned as a profile for the historic group of participants. In another example, stored information about the group of participants can be used to learn a session type associated with the group of participants. For example, if the participants in the group are generally social connections (e.g., through a social media graph) the session type associated with the group can be a personal session and if the participants in the group are generally business connections (e.g., through a career-based network graph or an employer network) the session type associated with the group can be a business session. In some implementations, profiles defined for specific participants can be automatically selected when the specific participants take part in a shared streaming data session.

At 708, process 700 can visually obscure objects based on the object sharing rules. For example, at least one object can match a rule that defines the object should be obscured in a shared streaming data session. One or more machine learning models can be trained/configured to track the object during the shared streaming data session (e.g., masking out portions of video frames corresponding to the identified objects) and a blocking object, filter, mask, or other suitable obscuring element can be generated in place of or over the object.

At 710, process 700 can cause the shared data stream to be displayed with the obscured objects. For example, a first user's shared streaming data session can be displayed to a second user and a third user, such as part of a video teleconference or a shared XR session. At the second or third user's client device (e.g., personal computing device, XR device, and the like) the first user's shared streaming data (e.g., streaming video) can be displayed, and the at least one object can be obscured in the display. In some implementation, object sharing rules for the second user and third user can be different. For example, the first user's shared streaming data can include the obscured object when displayed to the second user, however the first user's shared streaming data can include the object unobscured when displayed to the third user.

Figure 8:
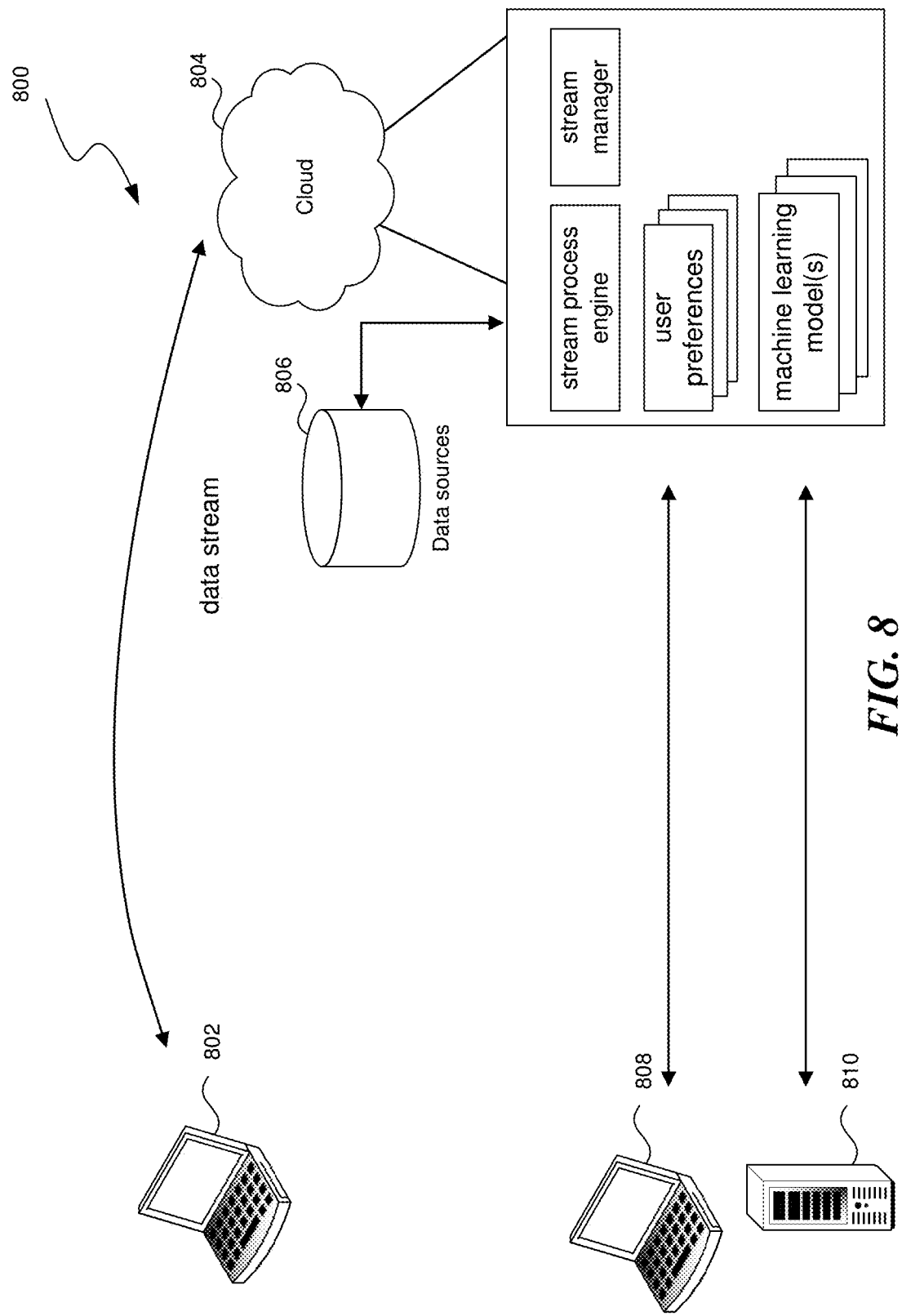
FIG. 8 is a diagram of a system for obscuring objects in data streams using machine learning.

FIG. 8 is a diagram of a system for obscuring objects in data streams using machine learning. System 800 includes client devices 802, 808, and 810, cloud 804, and database 806. Client device 802 can be a client system (e.g., XR system, personal computing device, and the like) associated with a principal user, where the device includes one or more image capturing devices (e.g., cameras). Client device 802 can capture a data stream (e.g., video stream, XR session, or other suitable stream) using the image capturing devices and transmit the stream to cloud 804. For example, the data stream can include objects in a field of view of the one or more image capturing devices, such as the principal user and a plurality of additional objects. Diagram 500 of FIG. 5 illustrates the field of view of one or more image capturing devices.

In some implementations, the data stream can be received at cloud 804, processed, and transmitted to client devices 808 (associated with a first participating user) and client device 810 (associated with a second participating user). For example, the principal user, first participating user, and second participating user can all be part of a video conference, video call, shared XR session, or other shared data streaming session.

At cloud 804, received data stream can be processed by a stream process engine. For example, the stream process engine can recognize objects in data streams using one or more machine learning model(s) at cloud 804 trained for object recognition. In another example, stream process engine can categorize recognized objects using one or more machine learning model(s) trained for object categorization.

In some embodiments, portions of functionality described for cloud 804 can be performed at one or more of client devices 802, 808, and/or 810. For example, client-side software can perform aspects of the stream processing described in implementations.

In some implementations, the recognized (and categorized) objects can be compared to user preferences at cloud 804 (and/or at one of the clients) to determine whether one or more of the objects should be obscured. For example, user preferences can include object sharing rules for the principal user that define whether an object in the shared data stream should be displayed to one or more of the participating users. When an object sharing rule defines that a recognized object should not be displayed to one or more participating users, the stream process engine can obscure the object (e.g., block display of the object to the one or more participating users by generating a blocking object, filter, mask or otherwise hiding the object from display).

User preferences can store rules for sharing objects in a data stream (e.g., video stream) and groups of object sharing rules, or profiles. An example object sharing rule defines an object category (e.g., a person) and a display status for the object category in a shared data stream (e.g., display or do not display). Example object categories include clothing, jewelry, food, beverage, house decor, a person, a pet, personal documents, furniture, alphanumeric characters, brands, logos, or any other suitable object category.

Another example object sharing rule can define a region, such as a predefined region or volume of space within the field of view of one or more cameras of client device 802 and a display status for the objects located within or outside the region (e.g., display or do not display). In this example, objects located within the region can be displayed while objects located outside the region can be obscured. Some implementations may include a rule that defines a list of permitted objects, such as a list of specific objects with specific object definitions predetermined for display in a shared stream (e.g., a whitelist). In this example, any object not included in the list of permitted objects is obscured.

In some implementations, user preferences can store different object sharing rules for different users and/or streaming session types. For example, first rules can define object sharing between the principal user and the first participating user, and second rules can define object sharing between the principal user and the second participating user. The first rules may define that a particular object category is not for display to the first participating user while the second rules may permit display of the object category to the second participating user. In this example, when the principal user's streaming data session includes an object of the particular object category, the display of the first user's streaming data session to the first participating user (e.g., using client device 808) will have an obscured object while the display of the first user's streaming data session to the second participating user (e.g., using client device 810) will include the object (without being obscured).

In some implementations, user preferences can store different object sharing rules for different streaming session types. Given the example of a video conference, a first streaming session type can be a business session while a second streaming session type can be a personal session. The streaming session type can be determined based on the user participants in the streaming session, by user input/selection, or through any other suitable means. First rules can define object sharing for the first streaming session type and second rules can define object sharing for the second streaming session type. For example, a user may find it more appropriate to obscure more objects in a business session than a personal session. According, when compared to the second rules, the first rules may define more object categories that should not be displayed in a shared stream, fewer objects explicitly permitted for display in a shared stream, and/or a defined region outside of which all objects should not be displayed in a shared stream. In some implementations, the first rules and second rules can be different profiles (e.g., sets of object sharing rules).

Machine learning model(s) at cloud 804 (and/or one of the clients) can be any model suitable to process data streams (e.g., video streams and/or artificial reality sessions) or any model suitable to learn trends from historic data and recommend/predict object sharing rules. For example, one or more machine learning models can be configured or trained for object recognition, object categorization, object tracking, or a combination of these. Machine learning model(s) can be capable of video processing and/or processing of data captured by image capturing devices (e.g., multiple cameras).

In some implementations, historic data about past streaming data sessions, users, and object sharing rules can be stored and used to train machine learning model(s). For example, the principal user can select or define sharing rules for a given streaming session with a given set of participant users. The stored data for this historic streaming data session can include one or more of: features of the principal user, features of the participant users, the object sharing rules implemented, a session type, timing for the session (e.g., time of day and/or day of week), and any other suitable contextual session information. The historic data can include several instances of stored data for past streaming data sessions.

One or more machine learning model(s) can be trained using this historic data and the trained machine learning models can learn trends, such as relationships among principal user features, participant user features, session type, and implemented object sharing rules. The trained machine learning model can be configured to generate predicted object sharing rules using a set of input features for a current or future streaming data session for a given user (e.g., principal user). For example, the input features can be features of the principal user, features of the user participants, timing features for the session (e.g., time of day and/or day of week), and any other suitable contextual data about the session. The generated object sharing rules can be a profile generated for the principal user and the current or future streaming data session. For example, the generated profile can be suggested to the principal user and, when accepted, the implemented object sharing rules for the principal user during the streaming session will be the generated profile's object sharing rules.

In some implementations, stored data can include past streaming sessions for a particular user. For example, using historic data stored for a single principal user, one or more machine learning model(s) can learn profiles that group object sharing rules with session types and/or user participants. In this example, a first profile can be learned based on stored data that reflects how a principal user defines object sharing rules when a session includes business user participants and a second profile can be learned that reflects how a principal user defines object sharing rules when a session includes personal user participants. Prior to a session (e.g., video conference or shared XR session) with a set of user participants, a profile (e.g., set of object sharing rules) can be suggested to the principal user for the session based on the user participants and/or session type. The historic data, user information, or other suitable stored data can be stored at database 806 and accessed by cloud 804.

Stream manager at cloud 804 can manage a streaming data session with multiple variants, such as a streaming data session with different object sharing rules for different participant users. In this example, different versions of the same streaming data session are displayed to different user participants, this can be a result of different rule sets specifying that some user participants are to have a first set of obscured objects while other user participants are have no or a different set of obscured objects. Stream manager can manage the different versions of the streaming data sessions such that the principal user's object sharing rules are implemented. For example, stream manager can mange the streams to client devices 808 and 810 such that the object sharing rules for the first participant user and the second participant user and implemented.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for obscuring objects in data streams using machine learning, the method comprising:
   receiving user input that provides one or more explicit display rules, wherein,
      a visual representation is displayed to a user comprising a field of view that includes the user and first objects recognized using one or more machine learning models,
      the user input selects at least one of the first objects, and
      a portion of the explicit display rules provided by the user input comprise a) a display status for the at least one selected first object, b) a category, recognized by the one or more machine learning models, for the at least one selected first object, and c) physical characteristics, recognized by the one or more machine learning models, for the at least one selected first object and/or a location, recognized by the one or more machine learning models, for the at least one selected first object;
   recognizing second objects, including at least a category for each of the second objects and one or more of a location for each of the second objects or physical characteristics for each of the second objects, in a streaming data session using one or more machine learning models, the streaming data session comprising a video stream or a shared artificial reality session;
   accessing rules, including the one or more explicit display rules, for displaying objects in shared streaming data sessions; and
   causing one or more of the recognized second objects to be obscured in the streaming data session, wherein,
      the causing is based on an application of the defined rules to the recognized category for the one or more second objects, and one or more of the recognized location of the one or more second objects or the recognized physical characteristics of the one or more second objects, and
      at least one of the second objects is obscured based on application of the portion of the explicit display rules.

2. The method of claim 1, wherein the at least one second object is obscured by causing a visual obscuring of the at least one second object from display when the streaming data session is displayed, the visual obscuring comprising visual blurring, visual blocking by a displayed obstruction, visual filter, or mask, or a combination thereof.

3. The method of claim 1, wherein the at least one second object is obscured by obscuring first portions of the object and not obscuring second portions of the object.

4. The method of claim 1, wherein the at least one second object comprises an alphanumeric character object and the portion of the explicit display rules define that alphanumeric character objects should not be displayed, or the at least one second object comprises a brand or logo object and the portion of the explicit display rules define that brand or logo objects should not be displayed.

5. The method of claim 1, the portion of the explicit display rules define a predetermined list of objects that should be displayed, each object on the predetermined list is defined using a category for each object and at least one physical characteristic for each object, and the at least one second object is obscured when application of the portion of the explicit display rules to the at least one second object determines that the at least one second object is not part of the predetermined list of objects.

6. The method of claim 1,
   wherein the rules are defined for a first user, the rules comprise first rules for displaying objects in streaming data sessions to a second user and second rules for displaying objects in streaming data sessions to a third user, and the second rules are different from the first rules, and
   wherein the at least one second object is obscured by:
      causing the streaming data session to be displayed to the second user and the third user, wherein the at least one second object is obscured from display to the second user and the at least one second object is not obscured from display to the third user.

7. The method of claim 6, wherein the streaming data session is captured using one or more image capturing devices at a client system associated with the first user, and the streaming data session is caused to be displayed to the second user and the third user as part of a video teleconference, a video call, or an artificial reality session.

8. The method of claim 1, wherein the streaming data session is captured using one or more image capturing devices at a client system, the streaming data session comprises a predefined region captured by the image capturing devices, and the rules define that objects located outside the predefined region should not be displayed.

9. The method of claim 1, the streaming data session comprises a shared artificial reality session with a plurality of users.

10. The method of claim 1, wherein,
   the user input defines one or more explicit display rules for a list of objects that should be displayed, each object on the list is defined using a category, recognized by the one or more machine learning models, for each object and one or more of: a) a physical characteristic, recognized by the one or more machine learning models, for each object; or b) a location, recognized by the one or more machine learning models, for each object, and the at least one second object is obscured when application of the one or more explicit rules to the at least one second object determines that the at least one second object is not part of the list of objects.

11. The method of claim 1, further comprising:
suggesting, to a first user, a sharing profile comprising a set of rules for displaying objects in shared streaming data sessions, wherein:
the suggested sharing profile is generated by a predictive model configured using historic data, the historic data comprising instances of: a) users participating in the historic shared streaming data sessions, and b) historic explicit rules, based on user input, for displaying objects implemented during the historic shared streaming data sessions, and
the rules comprise the set of rules from the suggested sharing profile when the first user accepts the suggestion.

12. The method of claim 11, wherein the predictive model comprises a machine learning model trained by the historic data, and the historic data comprises a) historic data for the first user and/or b) historic data for the first user and a plurality of additional users.

13. The method of claim 12, wherein the suggested sharing profile generated by the predictive model is based on a set of user participants for the streaming data session.

14. A computing system for obscuring objects in data streams using machine learning, the computing system comprising:
one or more processors; and
one or more memories storing instructions that, when executed by the one or more processors, cause the computing system to perform a process comprising:
receiving user input that provides one or more explicit display rules, wherein,
a visual representation is displayed to a user comprising a field of view that includes the user and first objects recognized using one or more machine learning models,
the user input selects at least one of the first objects, and
a portion of the explicit display rules provided by the user input comprise a) a display status for the at least one selected first object, b) a category, recognized by the one or more machine learning models, for the at least one selected first object, and c) physical characteristics, recognized by the one or more machine learning models, for the at least one selected first object and/or a location, recognized by the one or more machine learning models, for the at least one selected first object;
recognizing second objects, including at least a category for each of the second objects and one or more of a location for each of the second objects or physical characteristics for each of the second objects, in a streaming data session using one or more machine learning models, the streaming data session comprising a video stream or a shared artificial reality session;
accessing rules, including the one or more explicit display rules, for displaying objects in shared streaming data sessions; and
causing one or more of the recognized second objects to be obscured in the streaming data session, wherein,
the causing is based on an application of the defined rules to the recognized category for the one or more second objects, and one or more of the recognized location of the one or more second objects or the recognized physical characteristics of the one or more second objects, and
at least one of the second objects is obscured based on application of the portion of the explicit display rules.

15. The computing system of claim 14, wherein the at least one second object is obscured by causing a visual obscuring of the at least one object from display when the streaming data session is displayed, the visual obscuring comprising visual blurring, visual blocking by a displayed obstruction, visual filter, or mask, or a combination thereof.

16. The computing system of claim 14, wherein the portion of the explicit display rules define a predetermined list of objects that should be displayed, each object on the predetermined list is defined using a category for each object and at least one physical characteristic for each object, and the at least one second object is obscured when application of the portion of the explicit display rules to the at least one second object determines that the at least one second object is not part of the predetermined list of objects.

17. The computing system of claim 14,
wherein the rules are defined for a first user, the rules comprise first rules for displaying objects in streaming data sessions to a second user and second rules for displaying objects in streaming data sessions to a third user, and the second rules are different from the first rules, and
wherein the at least one second object is obscured by:
causing the streaming data session to be displayed to the second user and the third user, wherein the at least one object is obscured from display to the second user and the at least one object is not obscured from display to the third user.

18. The computing system of claim 17, wherein the streaming data session is captured using one or more image capturing devices at a client system associated with the first user, and the streaming data session is caused to be displayed to the second user and the third user as part of a video teleconference, a video call, or an artificial reality session.

19. The computing system of claim 14, wherein the process further comprises:
suggesting, to a first user, a sharing profile comprising a set of rules for displaying objects in shared streaming data sessions, wherein:
the suggested sharing profile is generated by a predictive model configured using historic data, the historic data comprising instances of: a) users participating in the historic shared streaming data sessions, and b) historic explicit rules, based on user input, for displaying objects implemented during the historic shared streaming data sessions, and
the rules comprise the set of rules from the suggested sharing profile when the first user accepts the suggestion.

20. A non-transitory computer-readable storage medium storing instructions that, when executed by a computing system, cause the computing system to perform a process for obscuring objects in data streams using machine learning, the process comprising:
receiving user input that provides one or more explicit display rules, wherein, a visual representation is displayed to a user comprising a field of view that includes the user and first objects recognized using one or more machine learning models, the user input selects at least one of the first objects, and a portion of the explicit display rules provided by the user input comprise a) a display status for the at least one selected first object, b) a category, recognized by the one or more machine learning models, for the at least one selected first object, and c) physical characteristics, recognized by the one or more machine learning models, for the at least one selected first object and/or a location, recognized by the one or more machine learning models, for the at least one selected first object;

recognizing second objects, including at least a category for each of the second objects and one or more of a location for each of the second objects or physical characteristics for each of the second objects, in a streaming data session using one or more machine learning models, the streaming data session comprising a video stream or a shared artificial reality session;

accessing rules, including the one or more explicit display rules, for displaying objects in shared streaming data sessions;

causing one or more of the recognized second objects to be obscured in the streaming data session, wherein, the causing is based on an application of the defined rules to the recognized category for the one or more second objects, and one or more of the recognized location of the one or more second objects or the recognized physical characteristics of the one or more second objects, and at least one of the second objects is obscured based on application of the portion of the explicit display rules.

* * * * *